Oct. 4, 1955    G. M. WALLER    2,719,759
TREAD UNIT
Filed Nov. 23, 1953    2 Sheets-Sheet 1

INVENTOR.
GUSTAV M. WALLER
BY
Parker & Carter
ATTORNEYS

Oct. 4, 1955 G. M. WALLER 2,719,759
TREAD UNIT
Filed Nov. 23, 1953 2 Sheets-Sheet 2

INVENTOR.
GUSTAV M. WALLER
BY
*Parker & Carter*
ATTORNEYS

United States Patent Office 2,719,759
Patented Oct. 4, 1955

2,719,759

TREAD UNIT

Gustav M. Waller, Geneva, Ill., assignor to Burgess-Norton Mfg. Co., Geneva, Ill., a corporation of Illinois Application November 23, 1953, Serial No. 393,721

3 Claims. (Cl. 305—10)

This invention relates to improvements in tread units for endless tracks of a military vehicle or the like and, more particularly, to tread units having a metal frame surrounded by or embedded in rubber tread blocks having a bottom ground-engaging face and a flat upper face for engagement with the bogie wheels of the vehicle.

Tread units of the general character above described have heretofore had a metal frame usually consisting of a pair of parallel spaced tubular pivot sleeves joined together at opposite ends by end plates having eyes in which the ends of the tubular sleeves are fastened as by brazing or welding. Because of their general shape, such metal frames are often referred to as of the "binocular" type. The tubular sleeves have pivot pins extending therethrough and projecting at opposite ends therefrom for connection to the pivot pins of adjacent tread units. The rubber block is molded about the frame and between the sleeves to complete the tread unit.

With conventional tread structures of the type above described, it is necessary to use high-grade tubular steel for the pivot sleeves, and heavy steel end frames of high tensile strength, in order to withstand the enormous pulling stresses on each tread link. It has also been found that, when the rubber block is molded on the frame with a substantial opening between the two tubular sleeves, there is considerable movement in the rubber block, sometimes referred to as "kneading," due to alternating compression of the rubber from above and below the block and concentrated in the open space between the sleeves, which tends to produce high temperatures under hard use, often sufficient to cause the rubber to break away from the sleeves, and even to blow out the rubber from the frame, due to gases generated within the rubber block.

Among the objects of the present invention is to provide an improved and more economical form of frame wherein separate tubular pivot sleeves are eliminated and instead two pivot sleeve portions are formed from a single piece of sheet metal, bent into shape to simulate tubular pivot sleeve portions and also forming an integral connecting web between the two tubular pivot sleeve portions so as to increase the strength of the tread frame in the direction of greatest normal stress, and also making it possible to reduce the size of the end frames without reducing the strength of the unit.

A further object of the invention is to provide a frame construction of the character just mentioned wherein the rubber can be molded to and against opposite sides of the central web connecting the two pivot sleeve portions so as to minimize the kneading effect heretofore present when the frame is made with separated or spaced tubular pivot sleeves, and also to provide metallic means for conducting any heat generated within the rubber block to the exterior of the tread unit.

A still further object of the invention is to provide a form of frame wherein the connecting web between the two tubular pivot sleeve portions is made of substantially double thickness of sheet metal, so as to increase the strength of the tread unit frame in the direction of greatest normal stress thereon.

Other objects and advantages of the invention will appear from time to time as the following description proceeds.

The invention may best be understood by reference to the accompanying drawings, in which.

Figure 1:
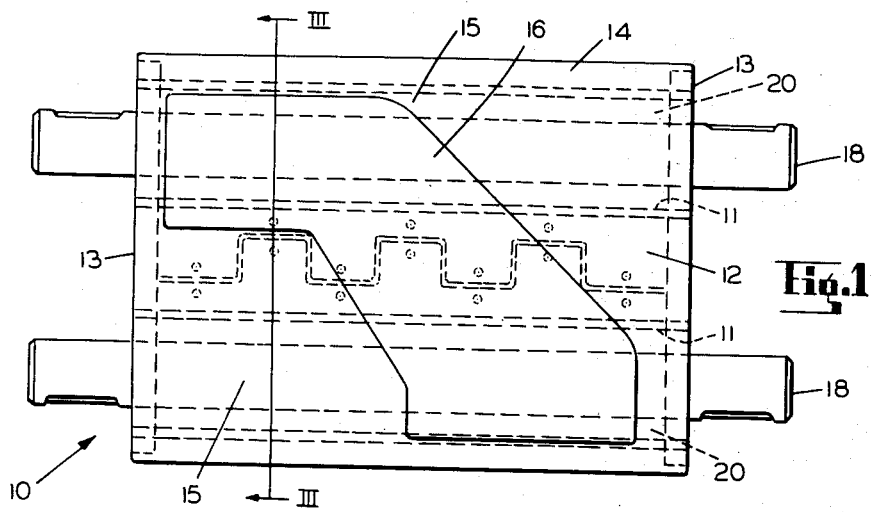
Figure 1 is a bottom view of a tread unit constructed in accordance with my invention.

Referring now to the embodiment of the invention illustrated in the drawings, Figure 1 shows a complete rubber-covered tread unit in the form in which it is adapted to be employed by insertion in a single-strand endless track. A tread unit, indicated generally at 10, consists essentially of a metal frame member including a pair of parallel spaced tubularly formed pivot bearing sleeves 11, 11 adapted to extend transversely of the track proper and connected together by an integral web portion indicated generally at 12, details of which will hereinafter more fully appear.

The frame also includes a pair of end bars 13, 13 rigidly secured at opposite ends of the pivot sleeves 11, 11 and their connecting web. The entire metal frame thus formed is covered by a rubber tread block 14 which may be molded in one piece thereon, with a bottom ground-engaging surface 15 including a cleat or grouser 16, and a flat upper face 17 for engagement by the bogie wheels of the vehicle. The end faces of the rubber block terminate substantially flush with the outer faces of the end plates 13, 13 so as to expose the open ends of the tubular shaped pivot sleeves 11 for mounting pivot pins 18, 18 extending through each of pivot sleeves. The pivot pins may, as usual, be supported in resilient rubber bushings 20, 20 in the pivot sleeves 11, 11 to provide the desired amount of flexible pivotal movement of the pins relative to the tread block.

The outer ends of the pivot pins 18, 18 project beyond the opposite ends of the tread block and are adapted to be connected by relatively short connectors of well-known form to join similar parts of pivot pins of adjacent tread units in short-coupled relationship. It will be understood that the form of tread block shown in Figure 1 has relatively short pivot pins designed for use in a single-strand endless track but that the pivot pins may be longer to accommodate two similar tread blocks in side-by-side relation for a double-strand endless track. In either case, the pivot pins 18, the resilient rubber bushings 20 and the connectors for the ends of the pivot pins may be of well-known construction, forming no part of the present invention so need not be described in further detail.

Figure 4:
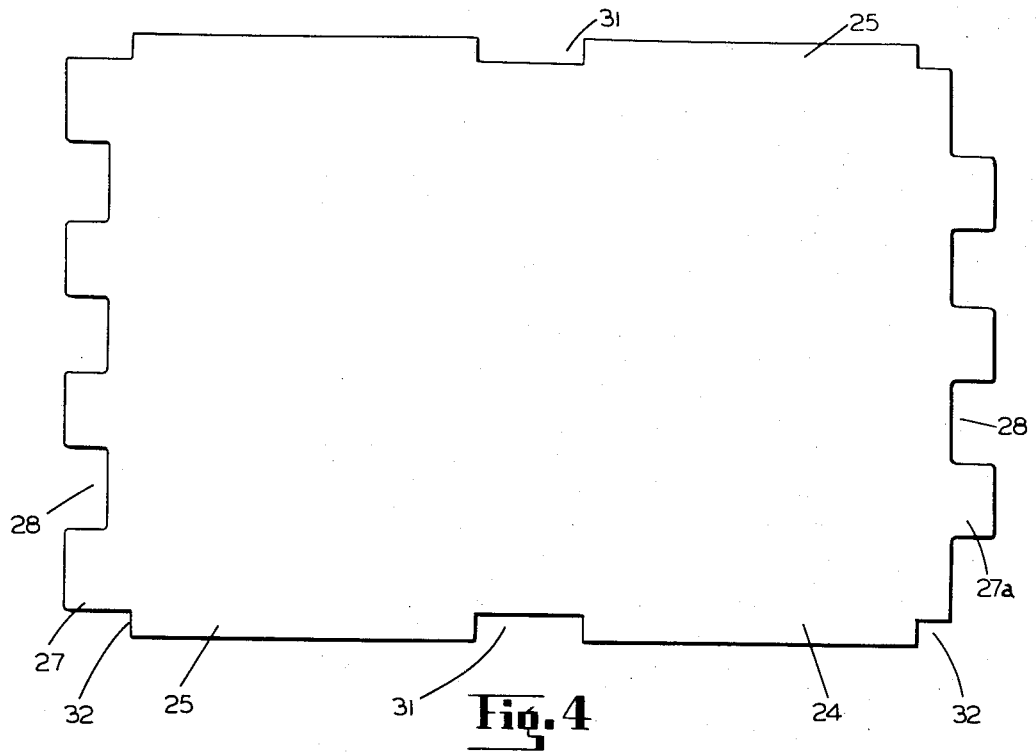
Figure 4 is a view of a blank of sheet metal which, when bent into proper shape, forms a substantial part of the metal frame shown in Figure 2.
Figure 5:
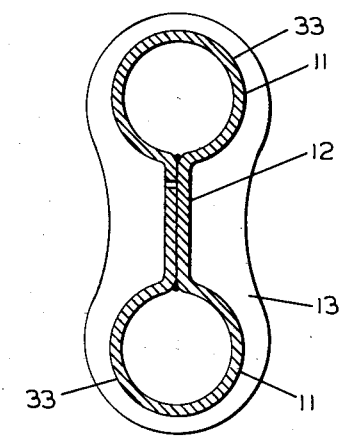
Figure 5 is a detailed section of the metal frame taken on line V—V of Figure 2.

Referring now more particularly to the metal frame of the tread unit 10, the tubular pivot sleeves 11, 11 and the connecting web 12 are formed of a single sheet of metal bent to shape from an initial blank 24 shown in Figure 4. As will be seen from this figure, the blank 24 consists of a generally rectangular piece of sheet metal with similar end portions 25, 25, each of sufficient length to produce the full diameter of one of the pivot sleeves 11 when formed over a mandrel, with terminal flange portions 27, 27a along the outer edge of the blank. One flange portion 27 is formed with a series of notches 28, 28, herein generally rectangular in shape, and arranged to interfit with similar rectangular notches 28a, 28a formed along the edges of the opposite terminal flange portion 27a of the other end of the blank 24, when the two pivot sleeves 11 are completed in substantially circular form, as shown in Figures 2 and 5.

As will be seen from these figures, said notches interfit with each other when the flange portions 27 and 27a are in overlapping relation with the adjacent flat central web portions 12a of the blank, to close the inner sides of the pivot sleeves 11, 11. The flange portions 27 and 27a are fused as by welding or brazing, or both, to the central web portions 12a, so as to form therewith the single web of double thickness indicated generally at 12.

Figure 2:
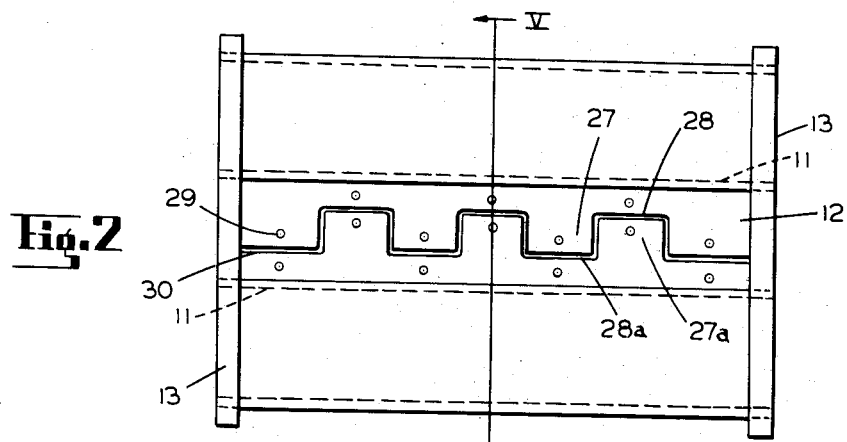
Figure 2 is a face view of a metal frame forming a part of the tread unit before the rubber covering and the pivot pins are applied thereto.

In the preferred form of frame shown in Figure 2, both spot welding, as indicated at 29, and continuous brazing, as indicated at 30, are used throughout the entire meeting faces of the flange end portions 27 and 27a with the central web portion 12a.

One method of brazing may be accomplished by inserting a length of brazing wire, before heating, along the point of juncture between the interfitting notches 28, 28a, as indicated in Figure 1.

Figure 3:
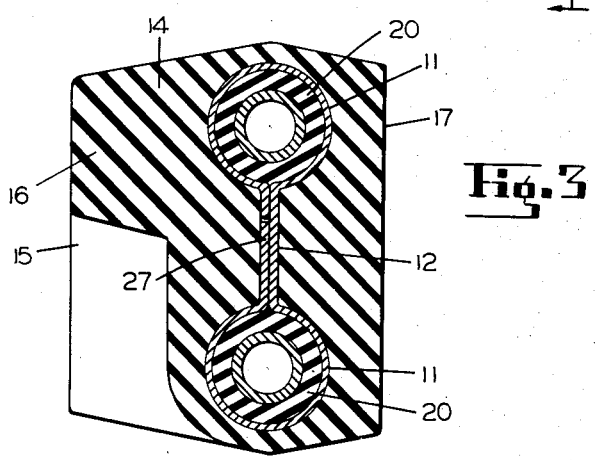
Figure 3 is a section taken on line III—III of Figure 1.

As will be seen in Figure 3, the central web 12, consisting of the central web portion 12a and the overlapping flanged portions 27 and 28a, are preferably disposed substantially along the plane coincident with the longitudinal axes of the two pivot sleeves 11, 11.

The central portion of the developed blank 24 is provided with notches 31, 31 along opposite sides thereof of substantially the same length as the space between the finally developed pivot sleeve portions 11. The flange portions 27 and 27a also have notches 32, 32 formed at opposite sides thereof. The end bars 13, 13 are finally secured over the opposite ends of the pivot sleeve portions 11, 11 after they are formed in tubular shape, with their outer ends projecting through, and fixed in, eyes 33, 33 in the end bars 13, 13, by brazing or welding. The notches 31, 31 and 32, 32 at opposite sides of the plate are of such depth to accommodate the central portions of the end plates. The inner faces of the end bars may be finally welded or brazed to the adjacent ends of the connecting web 12.

When the frame, including the pivot sleeves 11, 11 with their connecting web portion 12 and the end bars 13, 13, is completed, the rubber block 14 is molded around the frame in any suitable manner well known in the art so as to form a complete tread unit, as shown in Figure 1.

The method of forming the connecting web 12 of substantially double thickness, including the central web 12a of the blank and the overlapping and interfitting flange portions 27 and 27a at the outer ends of the blank, makes it possible to produce a tread link of substantially greater strength in the direction of the stresses normally imposed upon each tread unit of an endless track which tend to bend the two pivot sleeves apart from each other, as well as to spread them apart.

This construction also makes it possible to reduce the size and thickness of the end plates 13, 13 to a minimum inasmuch as a large proportion of the stress, normally assumed by the end plates in a conventional binocular type of tread unit frame, is assumed instead by the double thickness central web 12. As a result, the end plates can be covered by a greater thickness of rubber.

It will be noted further that the double thickness of the central web 12 provides means for greater conduction of heat from within the rubber tread block to the exterior of the block, thereby minimizing the danger of destruction and blowouts of the tread block, due to the kneading effect of the rubber between the pivot sleeves.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In a tread link for endless tracks, a metal frame including a pair of parallel spaced pivot sleeves and a web connecting said sleeves substantially for their full length, said sleeves and web being formed from a continuous blank of sheet metal into a flat central web, cylindrically shaped end portions, and terminal flange portions, the flange portions extending into abutting relation with each other and fused with each other and with said flat central web portion to form a composite connecting web of substantially double thickness, said composite web being disposed substantially in alignment with the axes of said cylindrically shaped pivot sleeves, and a pair of generally flat end plates disposed perpendicularly to said axes, each having a pair of apertures within which the opposite ends of the cylindrical pivot sleeves are fixed.

2. A tread link in accordance with claim 1, wherein the abutting edges of the flanges are formed with notches interfitting each other, the abutting edges of said notches being fused to each other and to the central web along lines extending longitudinally and transversely of the central web.

3. A tread link in accordance with claim 1, wherein opposite side edges of the sheet metal blank are formed with notches coincident with the central web and said end flanges, to accommodate the proximate portions of the end plates when the latter are assembled on the projecting ends of the pivot sleeves.

References Cited in the file of this patent

UNITED STATES PATENTS

| | | |
|---|---|---|
| 2,331,350 | Schonitzer et al. | Oct. 12, 1943 |
| 2,332,976 | Saurer et al. | Oct. 26, 1943 |